March 24, 1959 E. H. MUELLER 2,879,027
SAFETY GAS VALVE
Filed Aug. 24, 1953 2 Sheets-Sheet 1

INVENTOR.
ERVIN H. MUELLER
BY
Barnes Kisselle Laughlin & Raisch
ATTORNEYS.

March 24, 1959  E. H. MUELLER  2,879,027
SAFETY GAS VALVE

Filed Aug. 24, 1953  2 Sheets-Sheet 2

INVENTOR.
ERVIN H. MUELLER
BY
ATTORNEYS.

United States Patent Office 2,879,027
Patented Mar. 24, 1959

2,879,027
SAFETY GAS VALVE
Ervin H. Mueller, Grosse Pointe, Mich.
Application August 24, 1953, Serial No. 376,188
11 Claims. (Cl. 251—292)

This invention relates to a valve of the safety type, especially designed for use with gas burning equipment, such as a gas range.

The valve of the present invention is one wherein the operating handle or knob is normally inoperably associated with the movable valve member to the end that it may be rotated without operating the valve. Thus, small children who may play with or manipulate the handle or knob will not cause operation of the valve.

Heretofore, in arrangements of this general character, the structure for operably connecting and disconnecting the knob or handle and the rotary valve member has been incorporated in the handle or knob. Many range manufacturers or manufacturers of other equipment using gas as a fuel embody structural features and ornamental design features in their product which is characteristic of that particular manufacturer's product and/or which is considered desirable from an esthetic standpoint, and such structural and ornamental design frequently includes exposed visible parts, including the operating handles or knobs. When coupling mechanism is embodied in the operating knob or handle, the manufacturer may be limited in a design employed for the knob or handle and, in any event, is restricted.

The present invention aims to provide a novel valve construction wherein the mechanism for operably connecting and disconnecting the rotary member of the valve and an operating part is embodied in the valve structure itself. Thus, a manufacturer of ranges, for example, may, by acquiring a valve of the present invention, employ any sort of design or shape in the operating knob and this may be varied from time to time to suit various stove designs or models, without any interference whatsoever with the valve mechanism. Moreover, the valve construction is more or less standardized whereas the visible and manually operated knob or handle may be subject to much variation. A valve constructed in accordance with the invention is disclosed in the accompanying drawings.

Figure 1:
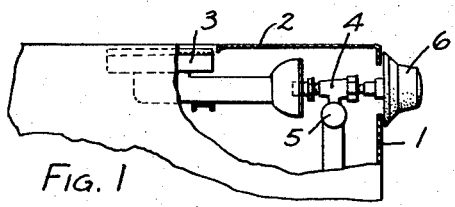
Fig. 1 is a general view illustrating a gas range with parts cut away and parts in section showing a general environment of the invention.

A portion of a gas range is illustrated in Fig. 1 and it is shown as having a front panel 1, a top panel 2, a burner 3 with its mixing tube, a valve 4 for supplying gas thereto, a gas supply pipe or manifold 5 and an operating knob or handle 6. For convenience hereinafter, the element 6 will be referred to as a knob, although it may be considered a handle.

Figure 2:
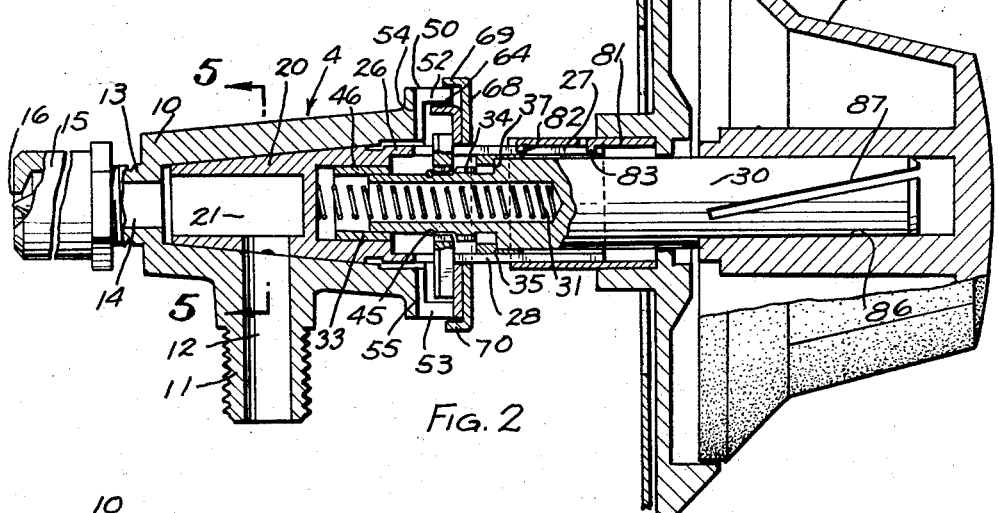
Fig. 2 is an enlarged cross sectional view of a valve constructed in accordance with the invention and showing the operating knob secured to its stem and showing the same in on position.

The valve 4, as shown in Fig. 2, has a body 10 with a tapered valve chamber therein, a threaded extension 11 having an inlet port 12 and a threaded extension 13 with an outlet port 14, and the extension 13 is provided with the usual hood 15 with a jet orifice 16. The valve is shown as being one of the type having a single outlet but insofar as the invention is concerned, the valve may have two or more outlets.

Figure 4:
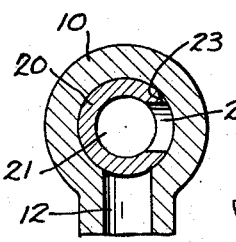
Fig. 4 is a cross sectional view taken through the valve illustrating the valve in off position.
Figure 3:
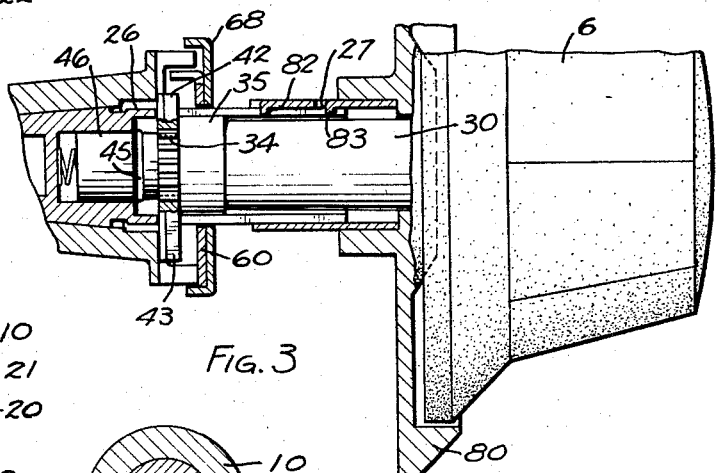
Fig. 3 is a view partly cut away but otherwise similar to Fig. 2 showing the knob pushed inwardly.
Figure 6:
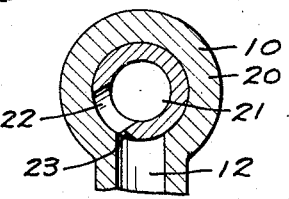
Fig. 6 is a view similar to Figs. 4 and 5 showing the valve in low or simmer position.

The rotary valve member 20 is of tapering form for fitting in the chamber and it has an axial passage 21, a port 22 and a tail port 23. This is a simple sort of valve construction and it is in off position when the valve member is rotatably located, as shown in Fig. 4, as it will be seen that the inlet port 12 is closed. If the valve member be turned about 90° clockwise from Fig. 4, the valve is full on or in high position, and it will be understood that the gas flows into passage 21 and thence into the outlet 14. If the valve member be rotated further clockwise to the position shown in Fig. 6, it is in low position at which time gas may flow through the tail port 23.

The valve member has a hollow extension 26 which is slotted as at 27 and 28 for purposes which will presently appear. An operating stem 30 has a hollow portion for receiving a spring 31 which reacts against the valve member 20 as shown. The stem 30 has an ensmalled inner end 33 provided with external teeth or serrations 34. A sleeve 35 is positioned over the stem and it forms a bearing for the stem within the hollow extension 26 of the valve member and the sleeve has an internal shoulder arranged to abut the shoulder 37 at the intersection of the body of the stem and its ensmalled end. A washer member 40 is positioned over the small projecting end of the stem and it has internal teeth or serrations 41, and it has two projecting fingers, one relatively short finger 42 and a relatively long finger 43. This washer member is freely mounted on the stem and it is held in position by a snap ring 45. A bearing sleeve 46 is positioned over the small end of the stem and it provides a bearing between the stem and the hollow portion of the valve member. The term "washer" as applied to the part 40 is not to be considered as a limiting term.

Figure 12:
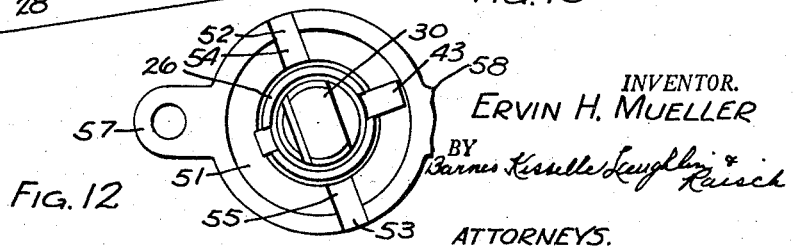
Fig. 12 is an end view of the body illustrating formation on the body and a washer element with some parts removed.

The body in the form shown has a rim or flange 50 which defines a chamber, the inner portion of which terminates in a circumferential surface 51. The rim 50 is slotted as at 52 and 53 and the slots extend somewhat into the surface 51 to thus form grooves or recesses 54 and 55 (Figs. 2 and 12). This slotted and grooved structure may be performed by a single machining operation with the slots 52 and 53 diametrically opposite each other as well also as the grooves 54 and 55. The body has extensions 57 and 58 with threaded apertures.

Figure 11:
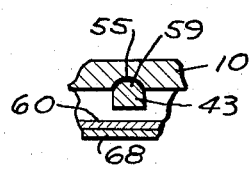
Fig. 11 is a sectional view taken substantially on line 11—11 of Fig. 9 showing a detent arrangement.

The projections 42 and 43 of the washer are rounded on their underside as shown in Fig. 11, so as to at times enter and fit into the grooves 54 and 55.

Figure 13:
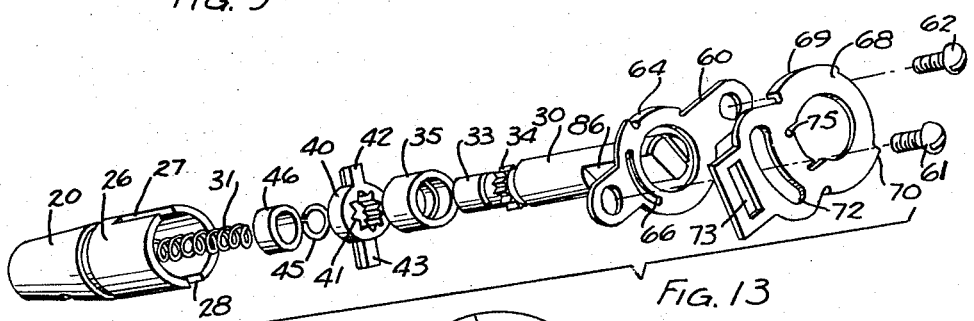
Fig. 13 is an exploded view illustrating various parts of the valve structure.

There is a cap 60 with apertured extensions for receiving holding screws 61 and 62 which pass into the apertures in the body. This cap has a down-turned partial flange 64 which fits within the flange 50 of the body and which forms a limit stop for the long projection 43. The cap is also provided with an arcuate slot 66 (Fig. 13). There is an adjusting plate 68 with downturned flange portions 69 and 70 for overlapping the cap and body flange 50 and this adjusting plate has an arcuate aperture 72 for receiving one of the screws, such as screw 61, and an aperture 73 for receiving a tool so that it may be turned substantially on the axis of the stem, the flange portions 69 and 70 serving to pilot the plate. Both the cap 60 and the adjusting plate are apertured so that the stem 30 projects therethrough and the adjusting plate 68 has a downturned finger 75 which projects through the arcuate slot 66 to form a stop for the long projection 43. The stop 75, however, is located radially outwardly of the end of the short projection 42 so that it does not contact projection 42. In making the assembly, the screw 61 is passed through the slot 72 and when it is tightened it holds the adjusting plate 68 in position. By loosening screw 61 the adjusting plate may be rotatably adjusted to thus vary the position of the stop 75 and this may be done by the use of a screw driver or similar tool applied to the slot 73. When adjustment is obtained screw 61 is tightened.

Figure 7:
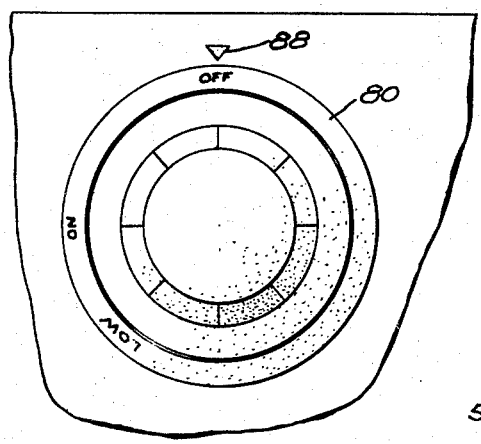
Fig. 7 is an elevational view of the operating knob or handle.

An indicating member which may be of disc form, as shown at 80, is provided with a hub 81 with one or more key members 82 and 83. The hub slips over the hollow extension of the member, as shown in Fig. 2, so that the indicator 80 moves with the valve member. The operating knob 86 is mounted on the end of the stem 30. This may be a frictional engagement with the stem having a flat portion 86 thus forming a D-formation and the knob is internally similarly formed. The stem may be slotted as at 87 to provide a measure of elasticity to hold the knob. The indicator 80 may have indicia thereon as shown in Fig. 7, indicating positions of the valve and the panel 1 may be provided with an index mark 88.

In the normal position of the parts, as shown in Fig. 2, the spring 31 urges the stem 30 outwardly which is to the right, as Fig. 2 is viewed. This movement is limited by reason of the projections 42 and 43 engaging with the internal surface of the cap. The retainer ring 45 abuts against the washer 40. Thus the stem is pushed outwardly and the teeth 34 are disengaged from the teeth 41 of the washer. It will be observed that the knob 85 may be turned thus turning the stem 30. The stem 30, however, is uncoupled from or inoperably associated with the valve 20 and the valve member 20 is not moved. In order to turn the valve member 20 the knob is pushed inwardly. This pushes the stem 30 inwardly and the teeth 34 move into mesh with the teeth 41 in the washer. Now, when the knob is turned, while maintaining axial pressure thereon, the valve member is rotated. As soon as the axial pressure is relieved the knob and the stem move back to the position shown in Fig. 2, thus disengaging the stem and the valve member. The interengaging teeth 34 and 41 have been spoken of as serrations; this is because serrations are preferred so that the teeth are relatively fine and easily become meshed with each other without rotary manipulation of the knob in order for an operator to "find" a position of engagement.

Figure 5:
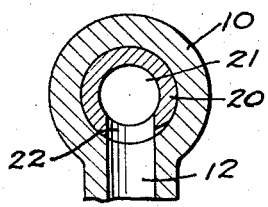
Fig. 5 is a cross sectional view similar to Fig. 4 and taken on line 5—5 of Fig. 2 showing the full on or high position.
Figure 8:
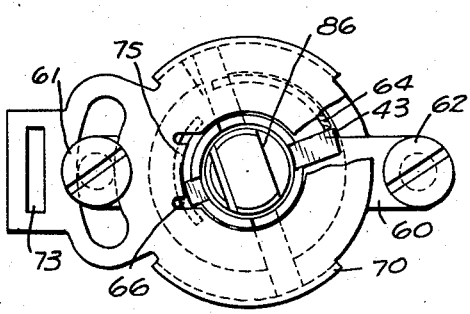
Fig. 8 is an end view of the valve with some parts cut away illustrating the position of parts in off position.
Figure 9:
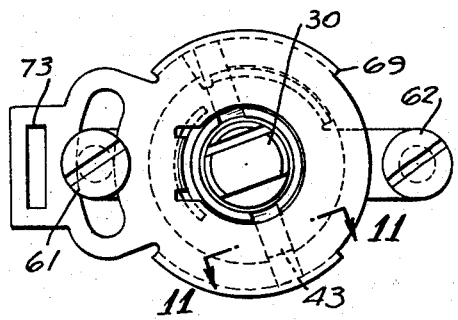
Fig. 9 is a view similar to Fig. 8 illustrating the position of parts in the full on or high position.
Figure 10:
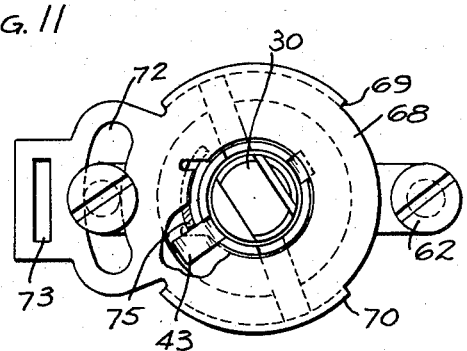
Fig. 10 is a view similar to Figs. 8 and 9 showing the position of parts in the low position.

In the off position, as shown in Fig. 4, the relatively long projection 43 abuts the limit stop 64 as shown in Fig. 8. As the valve is turned from the Fig. 4 position to the Fig. 5 position, it will be appreciated that the operator pushes the knob 85 to the left, as Fig. 2 is viewed, and the projections of the washer ride on the surface 51 of the valve body. This is because the member 35 abuts against the washer and the inward movement of the knob and stem is limited by reason of engagement of the projections 42 and 43 with the circumferential surface 51 of the body. With this condition maintained, the projections of the washer will move into the recesses 54 and 55 which are just below the surface of the circumferential surface 51. This occurs, as shown in Fig. 9, when the valve is in the full on or high position, as shown in Fig. 5, thus imparting intelligence to the user that the valve is in this position. Of course, when the knob is released the parts move back to the Fig. 2 position. To turn the valve to low position the knob is again pushed inwardly to engage the teeth 34 and 41 and the valve may be turned further clockwise to the Fig. 6 position. In this position, the long projection 43 engages the stop 75 (Fig. 10). Thus a small amount of gas flows through the tail port 23. This position may be adjustably determined, as above mentioned, by loosening the screw 61, rotatably adjusting the plate 68, and then tightening the screw 61 to thus give the desired opening at the tail port. Of course, once this adjustment is made, it normally remains in adjusted position over an indefinite period of time. This adjustment can be made by removing the knob and the inductor and passing the screw driver through the opening in the front panel 1. The valve may be turned back from the position shown in Fig. 6 to and/or through the position shown in Fig. 5 to the off position shown in Fig. 4, by pushing the stem inwardly to establish the driving connection.

Thus, the range manufacturer can select a type of knob and indicator according to his own desires and the knob may be made to fit on the stem 30, the same as it fits any other standard stem. Moreover, the hollow extension of the valve member and the stem may be provided in any length specified by the manufacturer to cover variations in distances between the valve body and the panel 1.

I claim:

1. A valve structure comprising, a body having a chamber open at one end, a valve member rotatably seated in the chamber, the body and valve member having ports arranged to be brought into and out of registry in different rotary positions of the valve member, an apertured cap for closing the open end of the chamber, the valve member having a hollow extension projecting through the cap, an operating stem slidably disposed in the hollow extension, teeth on the stem, a washer mounted on the stem for relative rotatable and axial movement, teeth on the washer, a projection on the washer non-rotatably connected with the said extension and lying between the body and the cap, abutment means on the stem for engaging the inner side of the washer, a spring reacting between the valve member and the stem normally holding the abutment against the washer with the projection on the washer abutting the cap, said spring holding the stem projected outwardly from the valve member so that the teeth on the stem and washer are normally disengaged, said stem being generally freely rotatable relative to said washer and valve member when said teeth are disengaged, said teeth being engaged by axial movement of the stem against said spring so that turning of the stem turns the washer and the valve member.

2. A valve structure comprising, a body having a chamber open at one end, a valve member rotatably seated in the chamber, the body and valve member having ports arranged to be brought into and out of registry in different rotary positions of the valve member, an apertured cap for closing the open end of the chamber, the valve member having a hollow extension projecting through the cap, an operating stem slidably disposed in the hollow extension, teeth on the stem, a washer mounted on the stem for relative rotatable and axial movement, teeth on the washer, a projection on the washer non-rotatably connected with the said extension and lying between the body and the cap, abutment means on the stem for engaging the inner side of the washer, a spring reacting between the valve member and the stem normally holding the abutment against the washer with the projection on the washer abutting the cap, said spring holding the stem projected outwardly from the valve member so that the teeth on the stem and washer are normally disengaged, said stem being generally freely rotatable relative to said washer and valve member when said teeth are disengaged, said teeth being engaged by axial movement of the stem against said spring so that turning of the stem turns the washer and the valve member, an indicator keyed to the extension of the valve member for showing the position of the valve member and an operating knob mounted on the stem and shiftable axially relative to the indicator.

3. A valve structure comprising a body, a valve member rotatably seated on the body, the body and valve member having ports arranged to be brought into and out of registry in different rotary positions of the valve member, an apertured cap mounted on the body, the valve member having a hollow extension projecting through the cap, an operating stem slidably disposed in the hollow extension, teeth on the stem, a washer mounted on the stem for relative rotatable and axial movement, teeth on the washer, a projection on the washer non-rotatably connected with the said extension and lying between the body and the cap, abutment means on the stem for engaging the inner side of the washer, a spring reacting between the valve member and the stem normally holding the abutment against the washer with the projection on the washer abutting the cap, said spring holding the stem projected outwardly from the valve member so that the teeth on the stem and washer are normally disengaged, said stem being generally freely rotatable relative to said washer and valve member when said teeth are disengaged, said teeth being engaged by axial movement of the stem against said spring so that turning of the stem turns the washer and the valve member.

4. A valve structure comprising, a body having a chamber open at one end, a valve member rotatably seated in the chamber, the body and valve member having ports arranged to be brought into and out of registry in different rotary positions of the valve member, an apertured cap secured to the valve body, the valve member having a hollow extension projecting through the cap, an operating stem slidably disposed in the hollow extension, said stem having an ensmalled inner end, an annular array of teeth on the ensmalled portion, a washer mounted on the ensmalled portion for relative rotation and axial movement of the washer and stem, said washer having an annular array of teeth, said washer being non-rotatably connected to the valve member, abutment means on the stem for engaging the inner side of the washer, means on the washer for engaging the cap, a spring reacting between the valve member and the stem for projecting the stem outwardly with the abutment engaging the washer and the washer engaging the cap to limit the outward position of the stem with the teeth on the stem and washer disengaged, whereby the stem may be freely rotated independently of the valve member in any rotative position of the valve member, said stem being shiftable axially against said spring to engage the teeth on the stem and washer for the turning of the valve member.

5. A valve structure comprising, a body having a chamber open at one end, a valve member rotatably seated in the chamber, the body and valve member having ports arranged to be brought into and out of registry in different rotary positions of the valve member, an apertured cap secured to the valve body, the valve member having a hollow extension projecting through the cap, an operating stem slidably disposed in the hollow extension, the cap and the body having axially spaced surfaces defining a chamber therebetween radially outwardly of the valve member, the stem having an annular array of teeth thereon, a washer mounted on the stem for relative rotatable and axial movement, the washer having an annular array of teeth thereon, said washer having a projection extending through the extension on the valve member to key the washer to the valve member and said projection lying in the chamber between the body and the cap, an abutment on the stem for engaging the inner side of the washer, a spring reacting between the valve member and stem normally holding the stem outwardly with said teeth disengaged, whereby the stem may be freely rotated independently of the valve member in any rotative position of the valve member, the abutment engaging the washer and the projection engaging the cap to limit the outer position of the stem, said stem being shiftable axially inwardly of the valve member against said spring to engage the teeth on the stem and washer for the turning of the valve member.

6. A valve structure comprising, a body having a chamber open at one end, a valve member rotatably seated in the chamber, the body and valve member having ports arranged to be brought into and out of registry in different rotary positions of the valve member, an apertured cap secured to the valve body, the valve member having a hollow extension projecting through the cap, an operating stem slidably disposed in the hollow extension, the cap and the body having axially spaced surfaces defining a chamber therebetween radially outwardly of the valve member, the stem having an annular array of teeth thereon, a washer mounted on the stem for relative rotatable and axial movement, the washer having an annular array of teeth thereon, said washer having a projection extending through the extension on the valve member to key the washer to the valve member and said projection lying in the chamber between the body and the cap, an abutment on the stem for engaging the inner side of the washer, a spring reacting between the valve member and stem normally holding the stem outwardly with said teeth disengaged, whereby the stem may be freely rotated independently of the valve member in any rotative position of the valve member, the abutment engaging the washer and the projection engaging the cap to limit the outer position of the stem, said stem being shiftable axially inwardly of the valve member against said spring to engage the teeth on the stem and washer for the turning of the valve member, means forming a second abutment on the stem for engaging the outer side of the washer, and the projection on the washer being engageable with said surface on the body to limit the inner position of the stem with said teeth engaged.

7. A valve structure comprising, a body having a chamber open at one end, a valve member rotatably seated in the chamber, the body and valve member having ports arranged to be brought into and out of registry in different rotary positions of the valve member, an apertured cap secured to the valve body, the valve member having a hollow extension projecting through the cap, an operating stem slidably disposed in the hollow extension, the cap and the body having axially spaced surfaces defining a chamber therebetween radially outwardly of the valve member, the stem having an annular array of teeth thereon, a washer mounted on the stem for relative rotatable and axial movement, the washer having an annular array of teeth thereon, said washer having a projection extending through the extension on the valve member to key the washer to the valve member and said projection lying in the chamber between the body and the cap, an abutment on the stem for engaging the inner side of the washer, a spring reacting between the valve member and stem normally holding the stem outwardly with said teeth disengaged, whereby the stem may be freely rotated independently of the valve member in any rotative position of the valve member, the abutment engaging the washer and the projection engaging the cap to limit the outer position of the stem, said stem being shiftable axially inwardly of the valve member against said spring to engage the teeth on the stem and washer for the turning of the valve member, means forming a second abutment on the stem for engaging the outer side of the washer, and the projection on the washer being engageable with said surface on the body to limit the inner position of the stem with said teeth engaged, and a recess in said surface of the body into which the projection on the washer is adapted to enter incident to axial inward pressure on the stem to thereby indicate a position of the valve member.

8. A valve structure comprising, a body having a chamber open at one end, a valve member rotatably seated in the chamber, the body and valve member having ports arranged to be brought into and out of registry in different rotary positions of the valve member, an apertured cap secured to the valve body, the valve member having a hollow extension projecting through the cap, an operating stem slidably disposed in the hollow extension, said stem having an ensmalled inner end, an annular array of external teeth on the ensmalled portion, a washer mounted on the ensmalled portion for relative rotation and axial movement of the washer and stem, said washer having an annular array of internal teeth, said washer being non-rotatably connected to the valve member, abutment means on the stem for engaging the inner side of the washer, means on the washer for engaging the cap, a spring reacting between the valve member and the stem for projecting the stem outwardly with the abutment engaging the washer and the washer engaging the cap to limit the outward position of the stem with the teeth on the stem and washer disengaged, whereby the stem may be freely rotated independently of the valve member in any rotative position of the valve member, said stem being shiftable axially against said spring to engage the teeth on the stem and washer for the turning of the valve member.

9. A valve structure comprising, a body having a chamber open at one end, a valve member rotatably seated in the chamber, the body and valve member having ports arranged to be brought into and out of registry in different rotary positions of the valve member, an apertured cap secured to the body, the valve member having a hollow extension projecting through the cap, the body and cap having axially spaced surfaces defining a chamber, an operating stem slidably and rotatably disposed in the hollow extension of the valve member, a washer mounted on the stem for relative rotation and axial movement, said washer having opposite projections projecting through the extension on the valve member to key the washer to the valve member and the projections lying in said chamber, an abutment on the stem for engaging the inner side of the washer, means forming a second abutment on the stem for engaging the outer side of the washer, the stem having an annular array of teeth, the washer having an annular array of teeth, a spring reacting between the valve member and stem urging the stem outwardly with the teeth on the stem and washer disengaged, whereby the stem may be freely rotated independently of the valve member in any rotative position of the valve member, the first abutment on the stem engaging the washer and the projections on the washer engaging the cap to limit the outward movement of the stem, said stem being shiftable inwardly against the spring to bring the teeth of the stem and washer into engagement for turning the valve member, the second abutment on the stem engaging the outer face of the washer and the projections on the washer engaging said surface of the valve body to limit the inward movement of the stem.

10. A valve structure comprising, a body having a chamber open at one end, a valve member rotatably seated in the chamber, the body and valve member having ports arranged to be brought into and out of registry in different rotary positions of the valve member, an apertured cap secured to the body, the valve member having a hollow extension projecting through the cap, the body and cap having axially spaced surfaces defining a chamber, an operating stem slidably and rotatably disposed in the hollow extension of the valve member, a washer mounted on the stem for relative rotation and axial movement, said washer having opposite projections projecting through the extension on the valve member to key the washer to the valve member and the projections lying in said chamber, an abutment on the stem for engaging the inner side of the washer, means forming a second abutment on the stem for engaging the outer side of the washer, the stem having an annular array of external teeth, the washer having an annular array of internal teeth, a spring reacting between the valve member and stem urging the stem outwardly with the teeth on the stem and washer disengaged, whereby the stem may be freely rotated independently of the valve member in any rotative position of the valve member, the first abutment on the stem engaging the washer and the projections on the washer engaging the cap to limit the outward movement of the stem, said stem being shiftable inwardly against the spring to bring the teeth of the stem and washer into engagement for turning the valve member, the second abutment on the stem engaging the outer face of the washer and the projections on the washer engaging said surface of the valve body to limit the inward movement of the stem.

11. A valve structure comprising, a body having a chamber open at one end, a valve member rotatably seated in the chamber, the body and valve member having ports arranged to be brought into and out of registry in different rotary positions of the valve member, an apertured cap secured to the body, the valve member having a hollow extension projecting through the cap, the body and cap having axially spaced surfaces defining a chamber, an operating stem slidably and rotatably disposed in the hollow extension of the valve member, a washer mounted on the stem for relative rotation and axial movement, said washer having opposite projections projecting through the extension on the valve member to key the washer to the valve member and the projections lying in said chamber, an abutment on the stem for engaging the inner side of the washer, means forming a second abutment on the stem for engaging the outer side of the washer, the stem having an annular array of external teeth, the washer having an annular array of internal teeth, a spring reacting between the valve member and stem urging the stem outwardly with the teeth on the stem and washer disengaged, whereby the stem may be freely rotated independently of the valve member in any rotative position of the valve member, the first abutment on the stem engaging the washer and the projections on the washer engaging the cap to limit the outward movement of the stem, said stem being shiftable inwardly against the spring to bring the teeth of the stem and washer into engagement for turning the valve member, the second abutment on the stem engaging the outer face of the washer and the projections on the washer engaging said surface of the valve body to limit the inward movement of the stem, the said surface on the valve body having a recess therein into which at least one projection on the washer is adapted to enter under the inward axial force on the stem to constitute a detent indicating a position of the valve member.

References Cited in the file of this patent

UNITED STATES PATENTS

| | | |
|---|---|---|
| 992,502 | Hollis | May 16, 1911 |
| 2,089,617 | Mueller | Aug. 10, 1937 |
| 2,501,008 | Schramm | Mar. 21, 1950 |
| 2,572,507 | Mueller | Oct. 23, 1951 |
| 2,675,207 | Mueller | Apr. 13, 1954 |